US012090837B2

(12) United States Patent
Matsuo et al.

(10) Patent No.: US 12,090,837 B2
(45) Date of Patent: Sep. 17, 2024

(54) OVER-FUELING PREVENTION VALVE

(71) Applicant: PIOLAX, INC., Kanagawa (JP)

(72) Inventors: Shinichi Matsuo, Kanagawa (JP); Nobuhiro Hirata, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 438 days.

(21) Appl. No.: 17/600,944

(22) PCT Filed: Apr. 3, 2020

(86) PCT No.: PCT/JP2020/015296
§ 371 (c)(1),
(2) Date: Oct. 1, 2021

(87) PCT Pub. No.: WO2020/209193
PCT Pub. Date: Oct. 15, 2020

(65) Prior Publication Data
US 2022/0194216 A1    Jun. 23, 2022

(30) Foreign Application Priority Data

Apr. 11, 2019    (JP) .................................. 2019-075599

(51) Int. Cl.
*B60K 15/035*    (2006.01)
(52) U.S. Cl.
CPC .. *B60K 15/035* (2013.01); *B60K 2015/03523* (2013.01); *B60K 2015/03566* (2013.01); *B60K 2015/03576* (2013.01)
(58) Field of Classification Search
CPC ........ B60K 15/035; B60K 2015/03523; B60K 2015/03566; B60K 2015/03576;
(Continued)

(56) References Cited

U.S. PATENT DOCUMENTS

| 2,886,052 A * | 5/1959 | Smith ..................... F16L 29/00 62/50.7 |
| 2001/0011538 A1* | 8/2001 | Crary .................. F02M 37/103 137/202 |
| 2013/0340890 A1* | 12/2013 | Matsuo .............. F02M 37/0029 141/198 |

FOREIGN PATENT DOCUMENTS

| JP | 5805750 B2 | 11/2015 |
| KR | 10-1076231 B1 | 10/2011 |

OTHER PUBLICATIONS

Jun. 16, 2020, International Search Report issued for related PCT application No. PCT/JP2020/015296.

(Continued)

*Primary Examiner* — Timothy L Maust
*Assistant Examiner* — Christopher M Afful
(74) *Attorney, Agent, or Firm* — Paratus Law Group, PLLC

(57) ABSTRACT

There is provided an over-fueling prevention valve including a housing provided with a first opening, a second opening, and a first valve seat; a main valve provided with a one end opening, the other end opening, and a second valve seat; a first biasing portion; a sub valve; and a second biasing portion. Biasing forces of the first biasing portion and the second spring are set such that a valve re-closing pressure of the main valve is higher than a valve re-opening pressure of the sub valve. In a state in which the main valve is separated from the first valve seat, the first opening and the second opening communicate with each other via an external space.

3 Claims, 9 Drawing Sheets

(58) Field of Classification Search
CPC ... B60K 15/03519; F16K 17/30; F16K 24/04; F16K 17/04; F02M 25/0872; F02M 37/0082; F02M 37/20; F02M 37/0029
USPC ........................................................ 141/198
See application file for complete search history.

(56) References Cited

OTHER PUBLICATIONS

Jun. 16, 2020, International Search Opinion issued for related PCT application No. PCT/JP2020/015296.

* cited by examiner

US 12,090,837 B2

OVER-FUELING PREVENTION VALVE

CROSS REFERENCE TO PRIOR APPLICATION

This application is a National Stage Patent Application of PCT International Patent Application No. PCT/JP2020/015296 (filed on Apr. 3, 2020) under 35 U.S.C. § 371, which claims priority to Japanese Patent Application No. 2019-075599 (filed on Apr. 11, 2019), which are all hereby incorporated by reference in their entirety.

TECHNICAL FIELD

The present invention relates to an over-fueling prevention valve for preventing additional fuel filling after a full tank limitation of a full tank limit valve at the time of filling fuel to a fuel tank.

BACKGROUND ART

A full tank limit valve is used at the time of filling fuel to a fuel tank of an automobile. However, in a normal full tank limit valve, since additional fuel filling is possible after a full tank limitation, when additional fuel filling is performed several times, a cut valve or the like disposed in the fuel tank is submerged in fuel, and a function of the cut valve may not work. Therefore, an over-fueling prevention valve is used to prevent additional fuel filling after a full tank limitation.

Patent Literature 1 discloses an over-fueling prevention valve of such a type in the related art. The over-fueling prevention valve includes a housing; a main valve that is slidably disposed in the housing, that is provided with a first valve seat provided at a first opening for communicating with the tank, that is configured to be brought into contact with or separated from a second valve seat provided at a second opening for communicating with a canister, and that is provided with a base end opening for communicating with the first opening, a tip end opening for communicating with the second opening, and a third valve seat provided at the base end opening; a first spring configured to bias the main valve toward the first valve seat; a sub valve that is slidably disposed in an internal space of the main valve and that is configured to be brought into contact with or separated from the third valve seat; and a second spring that is disposed in the main valve and is configured to bias the sub valve toward the third valve seat. Biasing forces of the first spring and the second spring are set such that a valve opening pressure of the sub valve relative to the third valve seat is higher than a valve re-opening pressure of the main valve relative to the second valve seat.

In the over-fueling prevention valve, when the full tank limit valve is closed and the pressure in the fuel tank rises at once, the main valve is pressed and slides against the biasing force of the first spring, and a tip end of the main valve is brought into contact with the second valve seat. Thereafter, the sub valve is also immediately pressed, slides against the biasing force of the second spring, and is separated from the third valve seat, so that gas such as fuel vapor and air in the fuel tank passes through the base end opening, the internal space, the tip end opening, and the like of the main valve, flows into a canister-side pipe, and the pressure in the fuel tank rapidly decreases. Thereafter, when the pressure in the fuel tank decreases, the sub valve is brought into contact with the third valve seat by the biasing force of the second spring in a state in which the main valve is brought into contact with the second valve seat, and the evaporation line is closed. Even in this case, since a certain amount of gas can flow through a contact surface between each valve and a corresponding valve seat, the pressure gradually decreases, and a lowering speed of a fuel liquid level that rose in the fuel filling pipe is reduced. Here, when additional fuel filling is performed, the fuel rises again in the fuel filling pipe, but when the timing is early, a state in which the main valve is brought into contact with the second valve seat and the sub valve is brought into contact with the third valve seat is maintained, and thus a state is maintained in which the lowering speed of the fuel liquid level is reduced. As a result, a fuel filling operator can recognize that a limit of additional fuel filling has been reached, and stops additional fuel filling.

CITATION LIST

Patent Literature

Patent Literature 1: JP 5805750 B

SUMMARY OF INVENTION

Technical Problem

As described above, in the over-fueling prevention valve, after the pressure in the fuel tank rises at once and the tip end of the main valve is brought into contact with the second valve seat, the sub valve is separated from the third valve seat, so that gas flows through the internal space of the main valve and the like and flows into the canister-side pipe, thereby rapidly lowering the internal pressure in the tank. However, since the gas flows through the internal space of the main valve or the like, it is difficult to ensure a sufficient flow path area, and there is room for improvement in terms of rapidly reducing the internal pressure in the tank.

Therefore, an object of the present invention is to provide an over-fueling prevention valve that can rapidly reduce the internal pressure in the tank after a full tank limitation of a full tank limit valve at the time of filling fuel.

Solution to Problem

In order to achieve the above object, the present invention provides an over-fueling prevention valve provided at an evaporation line of a fuel tank device. The fuel tank device includes a full tank limit valve that closes a discharge port of fuel vapor when a fuel liquid level reaches a predetermined height at the time of filling fuel to a fuel tank, and the evaporation line that enables an inner side of the fuel tank and a canister provided outside the fuel tank to communicate with each other. The over-fueling prevention valve includes a housing provided with a first opening that communicates with the fuel tank, a second opening that communicates with the canister, and a first valve seat provided at the first opening; a main valve that is slidably disposed in the housing, that is configured to be brought into contact with or separated from the first valve seat, that has an internal space inside the main valve, and that is provided with one end opening for communicating with the first opening, the other end opening for communicating with the second opening, and a second valve seat formed at the other end opening at a side close to the internal space; a first biasing portion configured to bias the main valve toward the first valve seat; a sub valve that is slidably disposed in the internal space of the main valve and is configured to be brought into contact with or separated from the second valve seat; and a second biasing portion that is disposed in the internal space of the main valve and is configured to bias the sub valve in a direction away from the second valve seat, in which biasing forces of the first biasing portion and the second biasing portion are set such that a valve re-closing pressure when the main valve is brought into contact with the first valve seat again from a state in which the main valve is separated from the first valve seat against a biasing force of the first biasing portion by a pressure in the fuel tank is higher than a valve re-opening pressure when the sub valve is separated from the second valve seat again from a state in which the sub valve is brought into contact with the second valve seat against a biasing force of the second biasing portion by the pressure in the fuel tank, and the first opening and the second opening are configured to communicate with each other via an external space between an inner periphery of the housing and an outer periphery of the main valve in a state in which the main valve is separated from the first valve seat.

Advantageous Effects of Invention

According to the present invention, the biasing forces of the first biasing portion and the second biasing portion are set such that the valve re-closing pressure of the main valve relative to the first valve seat is higher than the valve re-opening pressure of the sub valve relative to the second valve seat, and the first opening and the second opening communicate with each other via the external space in a state in which the main valve is separated from the first valve seat. Therefore, when the main valve slides from a state in which the main valve is separated from the first valve seat to a state in which the main valve is closed (when the main valve is closed again), the main valve slides while maintaining a state in which the sub valve is brought into contact with the second valve seat, so that a state is maintained in which the external space communicates with the first opening and the second opening. As compared with a configuration in which the second valve seat is provided at the second opening side in the over-fueling prevention valve (JP 5805750 B) in the related art, since the second valve seat to which the main valve is brought into contact and from which the main valve is separated is not provided at the second opening side in the over-fueling prevention valve according to the present invention, a large flow path area at the second opening side can be ensured. Therefore, when the main valve is separated from the first valve seat against the biasing force of the first biasing portion from a state in which the full tank limit valve is closed, the pressure in the fuel tank rises at once, and fuel filling is stopped, fuel vapor flows from the first opening and passes through the large second opening via the external space, so that fuel can smoothly flow out to the evaporation line, and the pressure in the fuel tank can be reduced faster than that in the over-fueling prevention valve in the related art.

BRIEF DESCRIPTION OF DRAWINGS

FIG. 2A is a cross-sectional perspective view, and FIG. 2B is a front view.

DESCRIPTION OF EMBODIMENTS

Hereinafter, an embodiment of an over-fueling prevention valve according to the present invention will be described with reference to the drawings.

Figure 7:
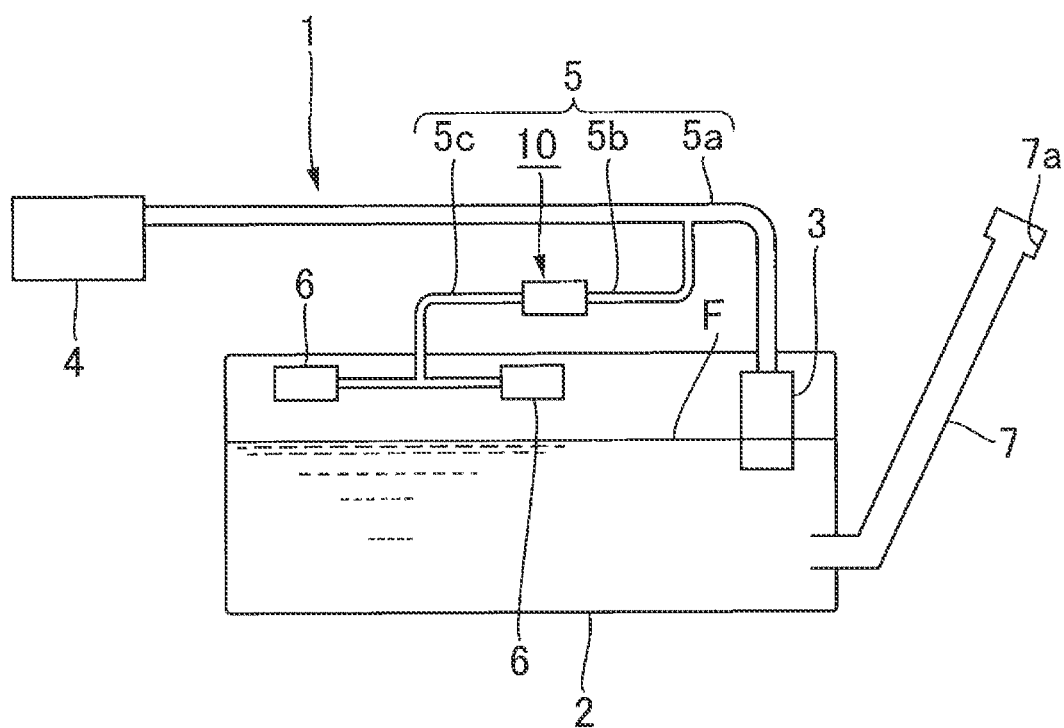
FIG. 7 is a schematic configuration diagram showing a fuel tank to which the over-fueling prevention valve is applied.

An over-fueling prevention valve 10 according to the present embodiment is disposed in a fuel tank device 1 as shown in FIG. 7. The fuel tank device 1 includes a fuel tank 2, a full tank limit valve 3 that is disposed inside the fuel tank 2 and closes a discharge port of fuel vapor when a fuel liquid level reaches a predetermined height at the time of filling fuel to the fuel tank 2, an evaporation line 5 that allows an inner side of the fuel tank 2 and a canister 4 disposed outside the fuel tank 2 to communicate with each other, and a plurality of cut valves 6 for preventing fuel from leaking to the outside when a fuel liquid level swings due to a sharp curve of a vehicle or when the vehicle rolls over. The plurality of cut valves 6 are disposed inside the fuel tank 2 above the fuel liquid level where a float of the full tank limit valve 3 rises to close a vent hole (see FIG. 7).

The evaporation line 5 includes a valve coupling pipe 5a of which one end is coupled to the full tank limit valve 3 and the other end is connected to the canister 4, a canister-side pipe 5b of which one end is coupled to an intermediate portion of the valve coupling pipe 5a and the other end is connected to the over-fueling prevention valve 10, and a tank-side pipe 5c of which one end is coupled to the over-fueling prevention valve 10 and is branched into a plurality of branch pipes having end portions coupled to the plurality of cut valves 6. An inner diameter of the tank-side pipe 5c or the canister-side pipe 5b is smaller than an inner diameter of the valve coupling pipe 5a.

Floats (not shown) are slidably disposed inside the full tank limit valve 3 and the cut valves 6, and these floats are always lowered by their own weights. Therefore, the full tank limit valve 3 and the canister 4 communicate with each other, and the plurality of cut valves 6 and the canister 4 communicate with each other, so that gas such as fuel vapor or air in the fuel tank 2 is discharged to the canister 4 outside the fuel tank through the evaporation line 5.

On the other hand, when fuel is filled from a fuel filling pipe 7 and the fuel liquid level of the fuel tank 2 rises, a float incorporated in the full tank limit valve 3 rises to close the discharge port, and discharge of the gas in the fuel tank 2 to the outside of the fuel tank 2 is stopped. The floats incorporated in the cut valves 6 above the full tank limit valve 3 do not rise at a fuel liquid level height where the float of the full tank limit valve 3 rises, and even when the discharge port of the full tank limit valve 3 is closed, the gas in the fuel tank 2 is discharged to the canister 4 through the tank-side pipe 5c, the over-fueling prevention valve 10, and the canister-side pipe 5b.

Figure 1:
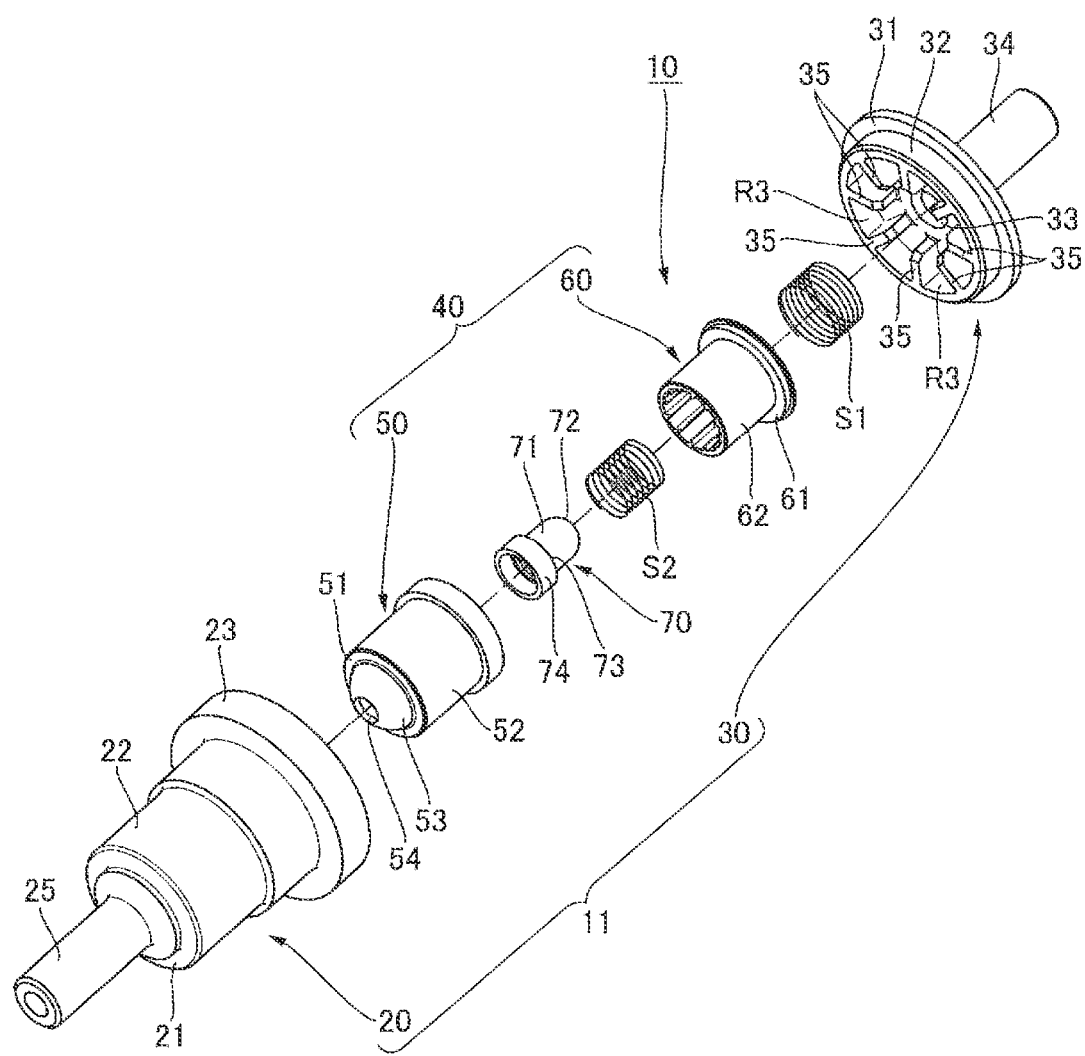
FIG. 1 is an exploded perspective view showing an embodiment of an over-fueling prevention valve according to the present invention.
Figure 3:
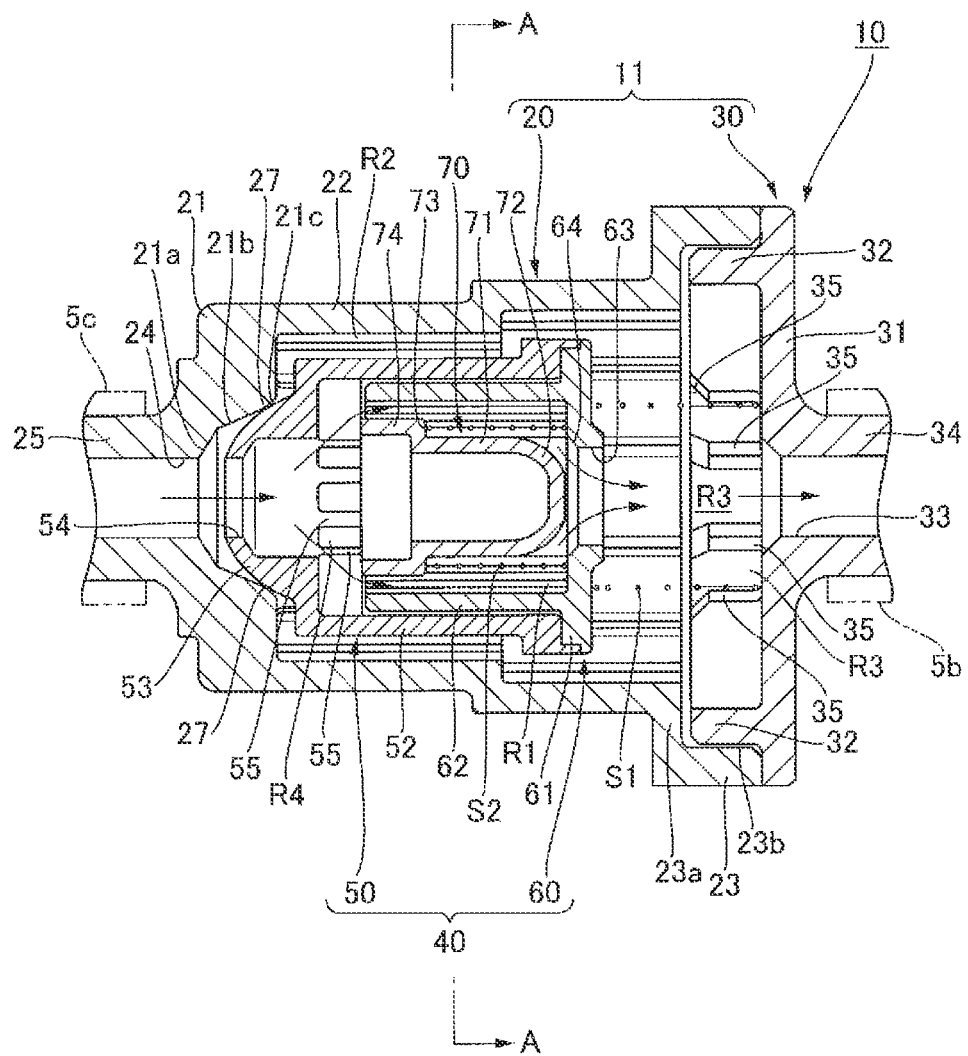
FIG. 3 is a cross-sectional view showing the over-fueling prevention valve in a state (normal state) in which the main valve is brought into contact with a first valve seat and a sub valve is separated from a second valve seat.

As shown in FIGS. 1 and 3, the over-fueling prevention valve 10 according to the present embodiment includes a housing 11 provided with a first opening 24, a second opening 33, and a first valve seat 27, a main valve 40 that is slidably disposed in the housing 11, that can be brought into contact with or can be separated from the first valve seat 27, that has an internal space R1, and that is provided with a second valve seat 64, a sub valve 70 that is slidably disposed in the main valve 40, a first spring S1 that is disposed in the housing 11 and biases the main valve 40 toward the first valve seat 27, and a second spring S2 that is disposed in the internal space R1 of the main valve 40 and biases the sub valve 70 in a direction away from the second valve seat 64. An external space R2 is formed between an inner periphery of the housing 11 and an outer periphery of the main valve 40.

The first spring S1 and the second spring S2 are so-called coil springs, the first spring S1 serves as a "first biasing portion" according to the present invention, and the second spring S2 serves as a "second biasing portion" according to the present invention.

The housing 11 includes a first housing 20 coupled to the tank-side pipe 5c and a second housing 30 that is assembled to the first housing 20 and coupled to the canister-side pipe 5b.

The first housing 20 is formed into a substantial bottomed cylindrical shape including a base portion 21 having a circular outer periphery and a cylindrical portion 22 that extends from a peripheral edge of the base portion 21 and has a substantially cylindrical shape. The cylindrical portion 22 is formed with an enlarged diameter portion 23 whose diameter is enlarged via a step portion 23a at a side opposite to the base portion 21, and an opening portion 23b is provided on an inner periphery of the enlarged diameter portion 23. Further, the first opening 24 that communicates with a tank side is formed at the center of the base portion 21, and a tank-side connecting pipe 25 connected to the tank-side pipe 5c extends from an outer peripheral edge of the first opening 24.

Figure 5:
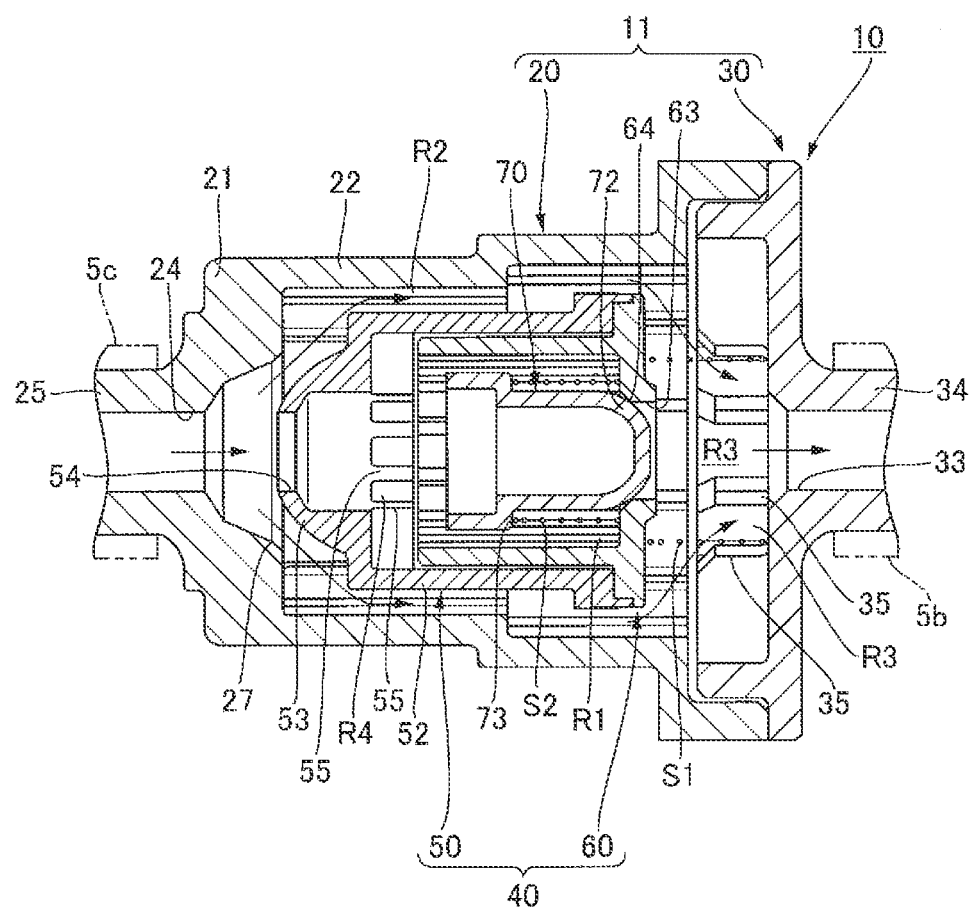
FIG. 5 is a cross-sectional view showing the over-fueling prevention valve in a state (main valve opened state) in which the main valve is separated from the first valve seal and the sub valve is brought into contact with the second valve seat.

A plurality of tapered surfaces 21a, 21b, and 21c that have different inclination angles and are increased in diameter toward the opening portion 23b are formed at an inner surface side of the base portion 21 from a peripheral edge of the first opening 24. The first valve seat 27 is provided at a boundary portion between the tapered surface 21b close to the first opening 24 and the tapered surface 21c that is adjacent to the tapered surface 21b and close to the opening portion 23b. As shown in FIGS. 3 and 5, a valve head 53 of the main valve 40, which will be described later, is brought into contact with or is separated from the first valve seat 27, thereby opening or closing the first opening 24. In the present embodiment, as shown in FIG. 3, the valve head 53 of the main valve 40 is brought into line contact with the first valve seat 27 so as to close the first opening 24.

On the other hand, the second housing 30 has a lid portion 31 that closes the opening portion 23b of the first housing 20, and a fitting cylindrical portion 32 that is fitted to an inner periphery of the opening portion 23b of the enlarged diameter portion 23 of the first housing 20 and is provided in a manner of protruding from an inner side of an outer peripheral edge portion of the lid portion 31, that is, an inner surface side of the lid portion 31. As shown in FIG. 3, in a state in which the fitting cylindrical portion 32 is fitted into the opening portion 23b, a tip end portion of the fitting cylindrical portion 32 is disposed in a manner of facing the step portion 23a of the first housing 20 and is covered by the step portion 23a, so that the tip end portion of the fitting cylindrical portion 32 is not brought into contact with nor separated from the main valve 40. That is, the fitting cylindrical portion 32 does not function as a valve seat that is brought into contact with or is separated from the main valve 40 to prevent ventilation.

The second opening 33 is formed at the center of the lid portion 31, and a canister-side connecting pipe 34 connected to the canister-side pipe 5b is provided in a manner of extending from an outer peripheral edge of the second opening 33. Further, as shown in FIGS. 1 and 3, a plurality of spring support ribs 35 are provided at an inner peripheral side of the fitting cylindrical portion 32 inside the lid portion 31 and are provided in a manner of protruding radially relative to the second opening 33 at equal intervals in a peripheral direction, and a ventilation path R3 is formed between adjacent spring support ribs 35 and 35.

One end of the first spring S1 is inserted into an inner side of the plurality of spring support ribs 35 to prevent inclination of the first spring S1, and the one end of the first spring S1 is brought into contact with and is supported by an inner surface of the lid portion 31 (see FIG. 3). Even when the main valve 40 is separated from the first valve seat 27 to a maximum extent and is brought into contact with the plurality of spring support ribs 35, since the ventilation paths R3 are formed between the spring support ribs 35, gas can flow through the ventilation paths R3. That is, these spring support ribs 35 do not function as valve seats that are brought into contact with or are separated from the main valve 40 to prevent ventilation.

As described above, the over-fueling prevention valve 10 has a configuration in which a valve seat that is brought into contact with or is separated from the main valve 40 to prevent ventilation is not provided at the second opening 33 side of the housing 11.

The main valve 40 that is slidably disposed in the housing 11 and is configured to be brought into contact with or separated from the first valve seat 27 has the internal space R1, and the main valve 40 is provided with a one end opening 54 that communicates with the first opening 24 side, the other end opening 63 that communicates with the second opening 33 side, and the second valve seat 64 that is formed in the other end opening 63 at a side close to the internal space R1. As shown in FIGS. 1 and 3, the main valve 40 according to the present embodiment includes a valve body 50 and a valve cap 60 assembled to the valve body 50.

Figure 2A:
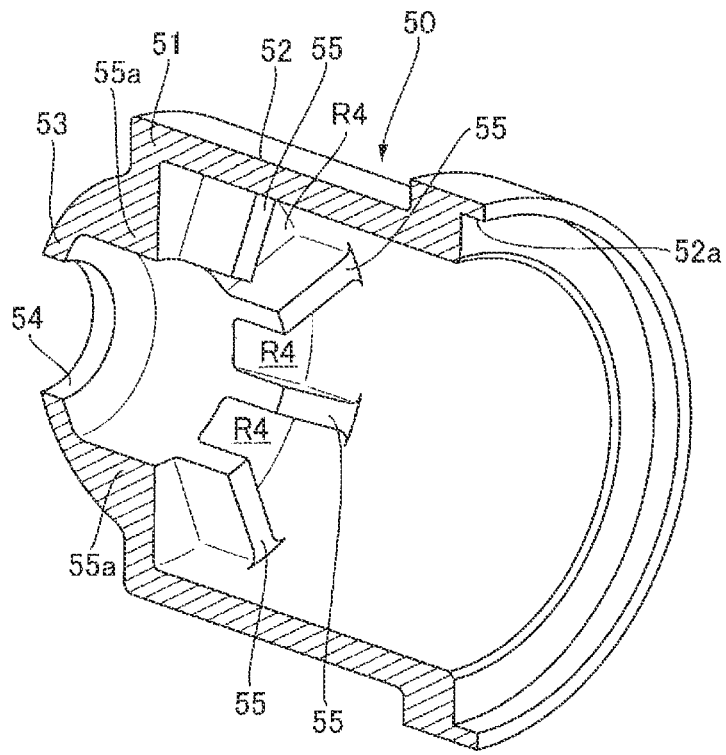
FIGS. 2A and 2B show a valve body constituting a main valve of the over-fueling prevention valve.
Figure 2B:
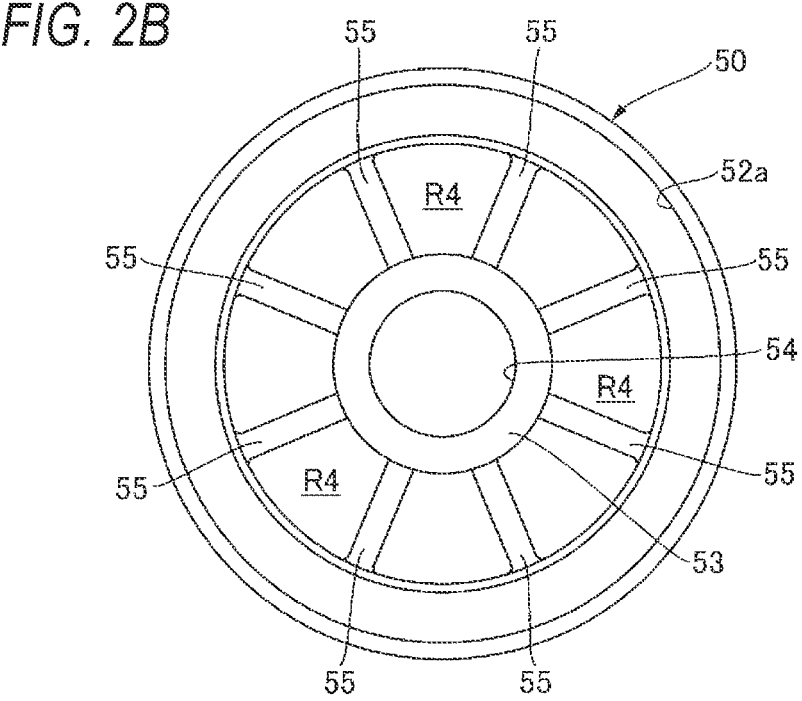

As shown in FIGS. 2A and 2B, the valve body 50 has a substantially bottomed cylindrical shape and includes a base portion 51 having a circular outer periphery and an outer cylindrical portion 52 that has a substantially cylindrical shape and extends from a peripheral edge of the base portion 51. An outer diameter of the outer cylindrical portion 52 is smaller than an inner diameter of the cylindrical portion 22 of the first housing 20. In this manner, the external space R2 is formed between an inner periphery of the cylindrical portion 22 of the housing 11 and an outer periphery of the outer cylindrical portion 52 of the main valve 40.

An opening portion 52a is formed in the outer cylindrical portion 52 at a side opposite to the base portion 51. Further, a valve head 53 is provided in a manner of protruding from an outer side of the base portion 51, is formed into a curved surface shape, and is brought into contact with or is separated from the first valve seat 27 at the housing 11 side. The valve head 53 is brought into contact with or is separated from the first valve seat 27 of the housing 11 so as to open or close the first opening 24 (see FIGS. 3 and 5). The one end opening 54 is formed at the center of a tip end of the valve head 53 to enable the internal space R1 of the main valve 40 to communicate with the outside of the main valve 40. The valve head 53 is formed such that a minute gap is formed between the first valve seat 27 and the valve head 53 even when the valve head 53 is brought into contact with the first valve seat 27, and gas can flow through the gap.

A plurality of sub valve contact ribs 55 with which a base end side of the sub valve 70 is brought into contact are provided on an inner periphery of the valve body 50 at a side close to the one end opening 54. Referring to FIGS. 2A and 2B, a rib support portion 55a that is formed to have a constant inner diameter larger than an inner diameter of the one end opening 54 is provided on inner peripheries of the base portion 51 and the valve head 53 of the valve body 50 in a manner in which the rib support portion 55a is thickened in the present embodiment. As shown in FIG. 2A, the sub valve contact rib 55 extends from an inner peripheral edge portion of the rib support portion 55a at a side opposite to the one end opening 54 to an inner peripheral surface of the outer cylindrical portion 52 via the base portion 51. As shown in FIG. 2B, a plurality of the sub valve contact ribs 55 are provided at equal intervals in the peripheral direction in a manner in which the sub valve contact ribs 54 form a radial shape relative to the one end opening 54. A ventilation path R4 that communicates with the one end opening 54 is formed between adjacent sub valve contact ribs 55 and 55.

On the other hand, as shown in FIG. 1, the valve cap 60 includes a lid portion 61 that closes the opening portion 52a of the valve body 50, and an inner cylindrical portion 62 that has a substantially cylindrical shape, is fitted to an inner periphery of the outer cylindrical portion 52 of the valve body 50, and is provided in a manner of protruding from an inner side of an outer peripheral edge portion of the lid portion 61, that is, an inner surface side of the lid portion 61. The other end opening 63 is formed at the center of the lid portion 61 so as to enable the internal space R1 of the main valve 40 to communicate with the outside of the main valve 40 (see FIG. 3). Further, the second valve seat 64 having a tapered shape whose diameter gradually increases toward the internal space R1 is formed at an inner peripheral edge portion of the other end opening 63 at a side close to the internal space R1.

The sub valve 70 that is slidably disposed in the internal space R1 of the main valve 40 configured as described above has a bottomed cylindrical shape of which a tip end side is closed by the valve head 72 and a base end side is opened. Specifically, the sub valve 70 includes a cylindrical portion 71 having a cylindrical shape, and a valve head 72 that has a curved surface shape and is provided at a tip end side in an extending direction of the cylindrical portion 71. The valve head 72 is brought into contact with or is separated from the second valve seat 64 so as to open or close the other end opening 63 (see FIGS. 3 and 5). An enlarged diameter portion 74 that has a larger diameter than the cylindrical portion 71 and has a cylindrical shape is continuously provided on a base end side in the extending direction of the cylindrical portion 71 via a spring support seat 73 having a stepped shape.

One end (an end portion at the canister-side pipe 5b side) of the first spring S1 disposed in the housing 11 is inserted into an inner side of the plurality of spring support ribs 35 of the second housing 30 and is supported on an inner surface of the lid portion 31, and the other end (an end portion at the tank-side pipe 5c side) is supported at an outer surface side of the base portion 51 of the valve body 50 and a peripheral edge portion of the other end opening 63 and is held in a compressed state between the housing 11 and the main valve 40. FIG. 3 shows a normal state in which a pressure inside the fuel tank 2 is lower than a predetermined value, and the full tank limit valve 3 or the cut valve 6 is opened. In this state, the first spring S1 biases a tip end side (a valve head 53 side) of the main valve 40 toward the first valve seat 27, and the valve head 53 is constantly brought into contact with the first valve seat 27.

On the other hand, one end (an end portion at the canister-side pipe 5b side) of the second spring S2 disposed in the internal space R1 of the main valve 40 is supported by being brought into contact with an outer peripheral edge portion of the second valve seat 64 at an inner surface side of the lid portion 61 of the valve cap 60, and is externally mounted to an outer side of the cylindrical portion 71 of the sub valve 70, and the other end (an end portion at the tank-side pipe 5c side) is brought into contact with and is supported by the spring support seat 73, and is held in a compressed state in the internal space R1 of the main valve 40. In the state shown in FIG. 3, since the second spring S2 biases a tip end side (a valve head 72 side) of the sub valve 70 in a direction away from the second valve seat 64, the tip end side of the sub valve 70 is constantly separated from the second valve seat 64, and the other end opening 63 of the main valve 40 is opened.

In the following description, a state in which the main valve 40 is brought into contact with the first valve seat 27 to close the first opening 24 and the sub valve 70 is separated from the second valve seat 64 to open the other end opening 63 as shown in FIG. 3 will be simply referred to as a "normal state".

In the normal state shown in FIG. 3, gas such as fuel vapor and air in the fuel tank 2 sequentially flows through the tank-side pipe 5c, the first opening 24, the one end opening 54, the internal space R1 of the main valve 40, the ventilation paths R4 between the plurality of sub valve contact ribs 55, a space between the inner periphery of the main valve 40 and the outer periphery of the sub valve 70, the second valve seat 64, the other end opening 63, the ventilation paths R3 between the plurality of spring support ribs 35, the second opening 33, and the canister-side pipe 5b, and is discharged to the canister 4. On the other hand, gas such as external air outside the fuel tank sequentially flows through a path (the canister-side pipe 5b, the second opening 33, the ventilation paths R3, . . . the first opening 24, and the tank-side pipe 5c) in a direction opposite to the gas discharge path described above, and is introduced into the fuel tank 2.

In the present embodiment, biasing forces of the first spring S1 and the second spring S2 are set such that a valve opening pressure when the main valve 40 is separated from the first valve seat 27 against the biasing force of the first spring S1 by a pressure in the fuel tank 2 is higher than a valve closing pressure when the sub valve 70 is brought into contact with the second valve seat 64 against the biasing force of the second spring S2 by a pressure in the fuel tank 2.

More specifically, when the pressure in the fuel tank 2 increases from the normal state shown in FIG. 3, as shown in FIG. 5, the main valve 40 slides against the biasing force of the first spring S1 and is separated from the first valve seat 27 to open the first opening 24. The pressure at this time (the pressure when the main valve 40 is separated from the first valve seat 27) is defined as a valve opening pressure of the main valve 40. Also, when the pressure in the fuel tank 2 increases from the normal state shown in FIG. 3, the sub valve 70 slides against the biasing force of the second spring S2 and is brought into contact with the second valve seat 64 to close the other end opening 63. The pressure at this time (the pressure when the sub valve 70 is brought into contact with the second valve seat 64) is defined as a valve closing pressure of the sub valve 70.

As described above, the biasing forces of the first spring S1 and the second spring S2 are set such that the valve opening pressure of the main valve 40 is higher than the valve closing pressure of the sub valve 70. As a result, when the pressure in the fuel tank 2 increases from the normal state shown in FIG. 3, prior to the main valve 40, the sub valve 70 slides against the biasing force of the second spring S2 and is brought into contact with the second valve seat 64, and then the main valve 40 slides against the biasing force of the first spring S1 and is separated from the first valve seat 27. That is, the main valve 40 slides and is separated from the first valve seat 27 while maintaining a state in which the sub valve 70 is brought into contact with the second valve seat 64 to close the other end opening 63. When the pressure in the fuel tank 2 increases rapidly, both the sub valve 70 and the main valve 40 slide with substantially no time lag.

In the over-fueling prevention valve 10, the first opening 24 and the second opening 33 communicate with each other via the external space R2 between the inner periphery of the housing and the outer periphery of the main valve in a state in which the main valve 40 is separated from the first valve seat 27.

In the present embodiment, as described above, when the pressure in the fuel tank 2 increases from the normal state as shown in FIG. 3, the main valve 40 is separated from the first valve seat 27 to open the first opening 24, and the sub valve 70 is brought into contact with the second valve seat 64 to close the other end opening 63, as shown in FIG. 5. A gas flow in the internal space R1 of the main valve 40 is blocked, and the first opening 24 and the second opening 33 communicate with each other only via the external space R2 between the inner periphery of the housing and the outer periphery of the main valve.

In the following description, a state in which the main valve 40 is separated from the first valve seat 27 to open the first opening 24 and the sub valve 70 is brought into contact with the second valve seat 64 to close the other end opening 63 as shown in FIG. 5 will be referred to as a "train valve opened state".

In the over-fueling prevention valve 10, the biasing forces of the first spring S1 and the second spring S2 are set such that a valve re-closing pressure when the main valve 40 is brought into contact with the first valve seat 27 again from a state in which the main valve 40 is separated from the first valve seat 27 against the biasing force of the first spring S1 by the pressure in the fuel tank 2 is higher than a valve re-opening pressure when the sub valve 70 is separated from the second valve seat 64 again from a state in which the sub valve 70 is brought into contact with the second valve seat 64 against the biasing force of the second spring S2 by the pressure in the fuel tank 2.

More specifically, when the pressure in the fuel tank 2 decreases from the main valve opened state shown in FIG. 5, the main valve 40 slides and is brought into contact with the first valve seat 27 due to the biasing force of the first spring S1 so as to close the first opening 24. The pressure at this time (the pressure when the main valve 40 is brought into contact with the first valve seat 27) is defined as a valve re-closing pressure of the main valve 40. When the pressure in the fuel tank 2 decreases from the main valve opened state shown in FIG. 5, the sub valve 70 slides and is separated from the second valve seat 64 due to the biasing force of the second spring S2 so as to open the other end opening 63. The pressure at this time (the pressure when the sub valve 70 is separated from the second valve seat 64) is defined as a valve re-opening pressure of the sub valve 70.

Figure 4:
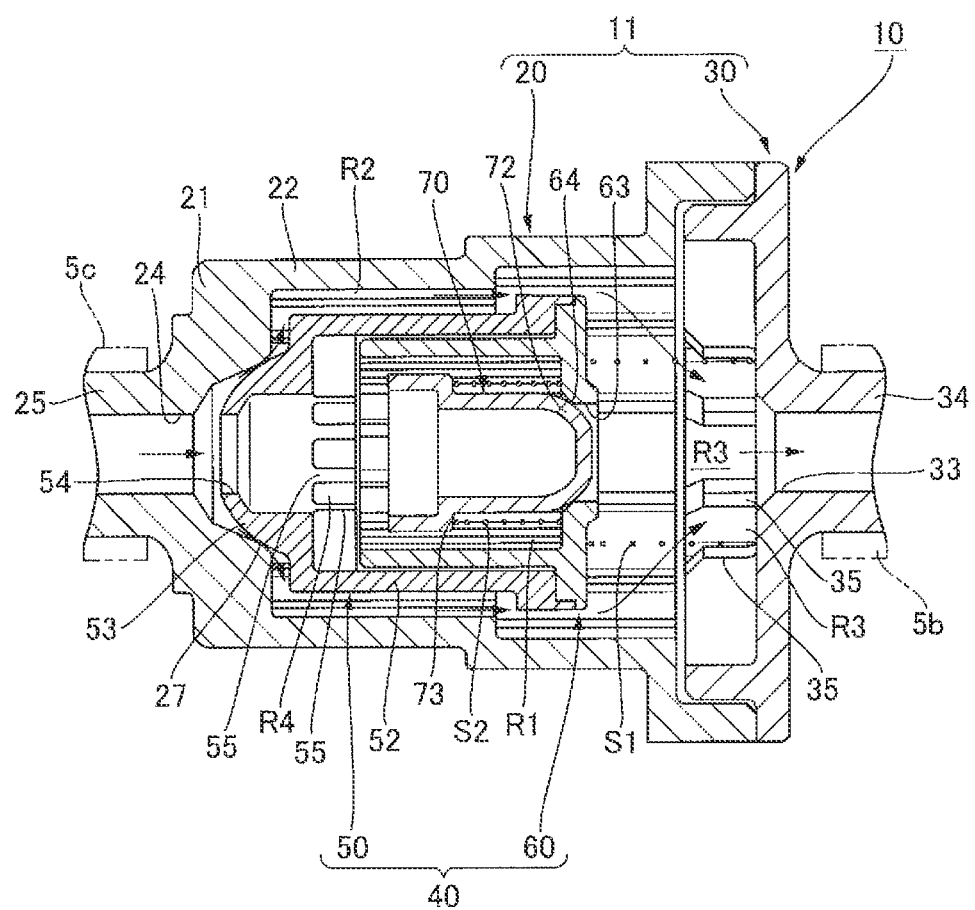
FIG. 4 is a cross-sectional view showing the over-fueling prevention valve in a state (two-valve closed state) in which the main valve is brought into contact with the first valve seat and the sub valve is brought into contact with the second valve seat.

As described above, the biasing forces of the first spring S1 and the second spring S2 are set such that the valve re-closing pressure of the main valve 40 is higher than the valve re-opening pressure of the sub valve 70. As a result, when the pressure in the fuel tank 2 decreases in the main valve opened state shown in FIG. 5, the main valve 40 slides and is brought into contact with the first valve seat 27 to close the first opening 24 as shown in FIG. 4 while maintaining a state in which the sub valve 70 is brought into contact with the second valve seat 64 to close the other end opening 63. Therefore, in the middle of sliding the main valve 40 when the main valve 40 is about to be closed, the sub valve 70 is separated from the second valve seat 64, and the other end opening 63 is prevented from being opened. As a result, gas is prevented from flowing in the internal space R1 of the main valve 40, and a state in which the first opening 24 and the second opening 33 communicate with each other only via the external space R2 is maintained.

When the pressure in the fuel tank 2 increases again in the state shown in FIG. 4, the main valve 40 slides and is separated from the first valve seat 27 as shown in FIG. 5 while maintaining a state in which the sub valve 70 closes the second valve seat 64. Even in this state, a state in which the first opening 24 and the second opening 33 communicate with each other only via the external space R2 is maintained.

In the following description, a state in which the main valve 40 is brought into contact with the first valve seat 27 to close the first opening 24, the sub valve 70 is brought into contact with the second valve seat 64 to close the other end opening 63, and both of the valves 40 and 70 are closed as shown in FIG. 4 will be referred to as a "two-valve closed state".

When the pressure in the fuel tank 2 further decreases from the two-valve closed state shown in FIG. 4 and the biasing force of the second spring S2 is larger than the pressure in the fuel tank 2, the sub valve 70 is separated from the second valve seat 64 again by the biasing force of the second spring S2 and returns to the normal state shown in FIG. 3.

In the over-fueling prevention valve described above, shapes and structures of the housing, the main valve, and the sub valve are not limited to those described above.

Next, functions and effects of the over-fueling prevention valve 10 configured as described above will be described with reference to a diagram showing a relationship between an internal pressure of the fuel tank 2 and elapse of time at the time of filling a fuel shown in FIG. 8. A horizontal axis in FIG. 8 also indicates states shown in FIGS. 3, 4, and 5.

Figure 8:
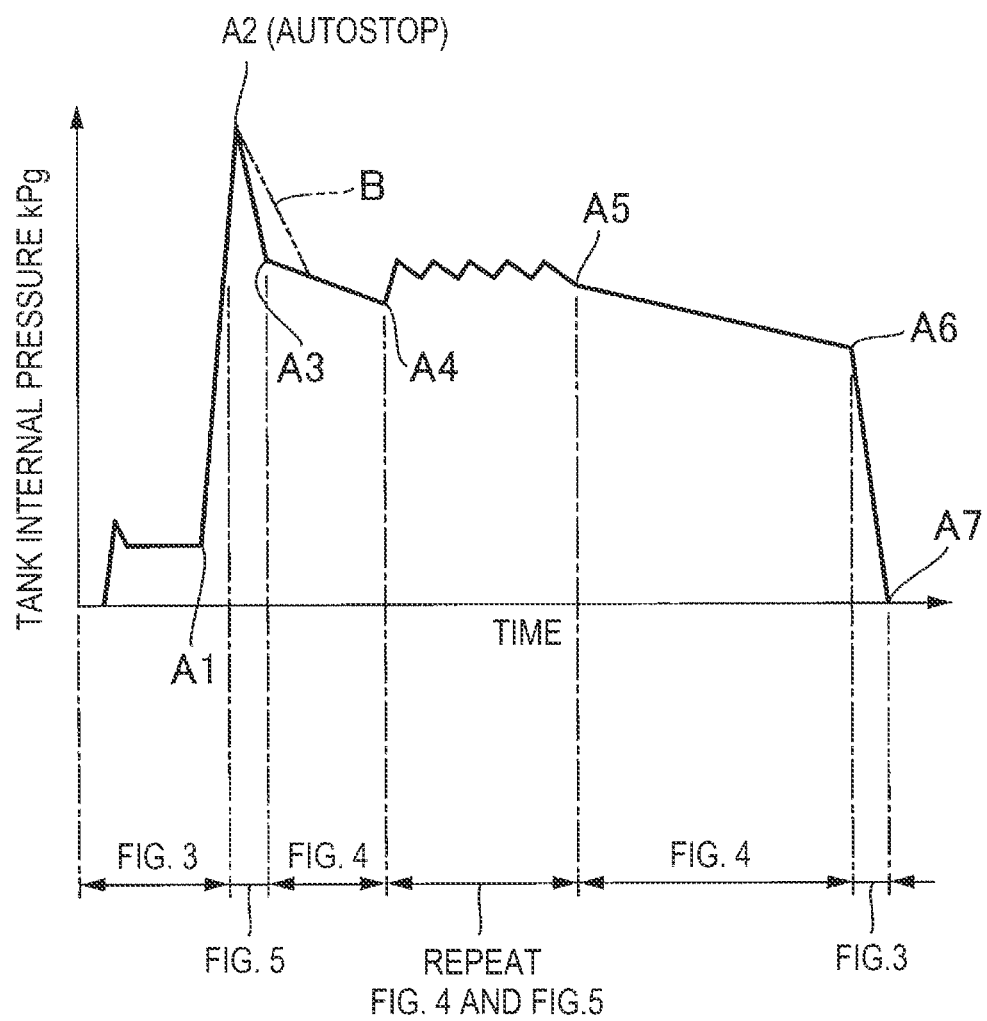
FIG. 8 is a diagram showing changes of an internal pressure of the fuel tank when filling fuel to a fuel tank using the over-fueling prevention valve according to the present invention.

In the over-fueling prevention valve 10 according to the present embodiment, the tank-side pipe 5c is connected to the tank-side connecting pipe 25 of the first housing 20, the canister-side pipe 5b is connected to the canister-side connecting pipe 34 of the second housing 30, so that the over-fueling prevention valve 10 is disposed in the evaporation line 5 of the fuel tank device 1, as shown in FIG. 8.

In a state in which the float of the full tank limit valve 3 does not rise and the vent hole is not closed, as shown in FIG. 3, the over-fueling prevention valve 10 is brought into a state in which the main valve 40 is brought into contact with the first valve seat 27 to close the first opening 24 and the sub valve 70 is separated from the second valve seat 64 to open the other end opening 63.

Then, when a fuel filling gun (not shown) is inserted into a fuel filling port 7a of the fuel filling pipe 7 of the fuel tank device 1 and fuel is filled into the fuel tank 2 through the fuel filling pipe 7, a fuel liquid level F in the fuel tank 2 gradually rises. Then, gas such as fuel vapor or air in the fuel tank 2 is discharged to the canister 4 through the full tank limit valve 3 and the valve coupling pipe 5a.

In this state, since the float incorporated in the cut valve 6 is also lowered, the gas in the fuel tank 2 passes through the cut valve 6 and the tank-side pipe 5c, then passes through the first opening 24, the one end opening 54, the ventilation paths R4 between the plurality of sub valve contact ribs 55, the internal space R1 of the main valve 40, a gap between the inner periphery of the main valve 40 and the outer periphery of the sub valve 70, the second valve seat 64, the other end opening 63, the ventilation paths R3 between the plurality of spring support ribs 35, and the second opening 33 in the over-fueling prevention valve 10, as indicated by arrows in FIG. 3, and then is discharged to the canister 4 through the canister-side pipe 5b and the valve coupling pipe 5a.

Thereafter, when the fuel liquid level F rises, the float of the full tank limit valve 3 is immersed, and the float rises to close a discharge port, gas cannot be discharged from the discharge port of the full tank limit valve 3 (see reference numeral A1 in FIG. 8). Even in this state, the gas in the fuel tank 2 is discharged from the cut valve 6 to the canister 4 through the tank-side pipe 5c, the over-fueling prevention valve 10, the canister-side pipe 5b, and the valve coupling pipe 5a, The inner diameters of the tank-side pipe 5c and the canister-side pipe 5b are small, and a flow rate cannot be increased so much due to a ventilation resistance when gas passes through the over-fueling prevention valve 10 and the like. Therefore, the pressure in the fuel tank 2 is increased at once by the fuel flowing vigorously into the fuel tank 2 (see reference numeral A2 in FIG. 8). As a result, the fuel flows backward through the fuel filling pipe 7 and moves up to the fuel filling port 7a side, a sensor of a fuel filling nozzle detects the fuel, fuel filling is stopped (referred to as autostop or the like), and a full tank limitation is performed.

In the over-fueling prevention valve 10, the following operation is performed to prevent over-fueling in response to an operation of the full tank limit valve 3.

That is, as described above, when the float of the full tank limit valve 3 rises to close the vent hole and the pressure in the fuel tank 2 increases at once, the main valve 40 is pressed from the normal state shown in FIG. 3. At this time, since the biasing forces of the first spring S1 and the second spring S2 are set such that the valve opening pressure of the main valve 40 is higher than the valve closing pressure of the sub valve 70 in the present embodiment, first, the sub valve 70 slides and is brought into contact with the second valve seat 64 against the biasing force of the second spring S2, and then the main valve 40 slides and is separated from the first valve seat 27 against the biasing force of the first spring S1, or both the sub valve 70 and the main valve 40 slide with substantially no time lag. Accordingly, as shown in FIG. 5, the main valve 40 is separated from the first valve seat 27 and is brought into a main valve opened state while maintaining a state in which the sub valve 70 is brought into contact with the second valve seat 64 to close the other end opening 63.

As a result, as indicated by arrows in FIG. 5, the gas in the fuel tank 2 passes through the first opening 24, the external space R2 between the inner periphery of the housing 11 and the outer periphery of the main valve 40, the other end opening 63, the ventilation paths R3 between the plurality of spring support ribs 35, and the second opening 33 in the over-fueling prevention valve 10, and then is discharged to the canister 4 through the canister-side pipe 5b and the valve coupling pipe 5a. As a result, it is possible to prevent the pressure in the fuel tank 2 from further increasing and prevent the fuel from overflowing from the fuel filling port 7a. A pressure fluctuation in the fuel tank 2 at this time is indicated by lines represented by reference numerals A2 and A3 in FIG. 8, and the pressure in the fuel tank 2 rapidly decreases. As a result of the pressure decrease in the fuel tank 2, the fuel liquid level that rose in the fuel filling pipe 7 is gradually lowered.

In the over-fueling prevention valve 10, as described above, the biasing forces of the first spring S1 and the second spring S2 are set such that the valve re-closing pressure of the main valve 40 is higher than the valve re-opening pressure of the sub valve 70. Therefore, when the pressure in the fuel tank 2 decreases from the main valve opened state shown in FIG. 5 and the biasing force of the first spring S1 is larger than the pressure in the fuel tank 2, as shown in FIG. 4, the main valve 40 slides and is brought into contact with the first valve seat 27 again to close the first opening 24 while maintaining a state in which the sub valve 70 is brought into contact with the second valve seat 64 to close the other end opening 63, the main valve 40 and the sub valve 70 are brought into the two-valve closed state, and the evaporation line 5 is closed by the main valve 40 and the sub valve 70.

Even in this case, as described above, through the minute gap between the valve head 53 and the first valve seat 27, gas flows into the canister-side pipe 5b through the external space R2 as indicated by arrows in FIG. 4, and is discharged to the canister 4 through the valve coupling pipe 5a, so that the pressure in the fuel tank 2 gradually decreases. A pressure fluctuation in the fuel tank 2 at this time is indicated by lines represented by reference numerals A3 and A4 in FIG. 8, and the pressure in the fuel tank 2 decreases more gently than the inclined lines represented by the reference numerals A2 and A3. As a result, a lowering speed of the fuel liquid level in the fuel filling pipe 7 is slower than a lowering speed in the main valve opened state shown in FIG. 5.

When additional fuel filling is performed in the above state, the fuel rises again in the fuel filling pipe 7, and the fuel comes close to the fuel filling port 7a, so that an operator stops filling fuel. At this time, a lowering speed of a fuel liquid level in the fuel filling pipe 7 can be confirmed by visually checking the fuel liquid level in the fuel filling pipe 7 from the fuel filling port 7a.

Thereafter, when the pressure in the fuel tank 2 is increased again by the additional fuel filling from the two-valve closed state shown in FIG. 4, the main valve 40 is opened in a state in which the sub valve 70 is closed, the main valve 40 is brought into the main valve opened state shown in FIG. 5, and the pressure in the fuel tank 2 decreases. Thereafter, when the pressure in the fuel tank 2 further increases, the state changes from the two-valve closed state shown in FIG. 4 to the main valve opened state shown in FIG. 5, the pressure in the fuel tank 2 slightly decreases, and the state changes to the two-valve closed state shown in FIG. 4. In this manner, the two-valve closed state shown in FIG. 4 and the main valve opened state shown in FIG. 5 are alternately repeated (see zigzag lines represented by reference numerals A4 and A5 in FIG. 8). At this time, when the two-valve closed state (see FIG. 4) and the main valve opened state (see FIG. 5) are repeated, the fuel liquid level in the fuel filling pipe 7 is less likely to be lowered. As a result, a fuel filling operator can recognize that the fuel tank 2 is almost full of fuel and fuel reaches a limit of additional fuel filling. Therefore, additional fuel filling can be stopped and additional fuel filling by a fuel filling operator can be prevented.

Therefore, it is possible to prevent problems that the fuel tank 2 is filled with fuel at a height equal to or higher than a limit height, the float of the cut valve 6 is submerged, and the evaporation line 5 is closed.

Thereafter, as indicated by lines represented by reference numerals A5 and A6 in FIG. 8, when the pressure in the fuel tank 2 further decreases (this state is defined as the two-valve closed state in FIG. 4) and the pressure in the fuel tank 2 is equal to or lower than a predetermined value, the biasing force of the second spring S2 is larger than the pressure in the fuel tank 2, the sub valve 70 is separated from the second valve seat 64 (the sub valve 70 is re-opened), the main valve 40 is brought into contact with the first valve seat 27, and the state returns to the normal state in FIG. 3 again. At this time, timing when the sub valve 70 is re-opened is shown at a position represented by the reference numeral A6 in FIG. 8.

Then, the gas in the fuel tank 2 is again discharged to the canister 4 through the first opening 24, the one end opening 54, the ventilation paths R4 between the plurality of sub valve contact ribs 55, the internal space R1 of the main valve 40, and the like as indicated by the arrows in FIG. 3. Therefore, in the two-valve closed state shown in FIG. 4, the pressure in the fuel tank 2 rapidly decreases and the state returns to the normal state as compared with a case in which the gas flows through the minute gap between the valve head 53 and the first valve seat 27. A pressure fluctuation in the fuel tank 2 at this time is indicated by reference numerals A6 and A7 in FIG. 8.

In this manner, the over-fueling prevention valve 10 according to the present invention can reduce a lowering speed of a fuel liquid level at the time of additional fuel filling, an operator can recognize that the additional fuel filling is not necessary, so that problems of over-fueling can be prevented.

In the over-fueling prevention valve 10, the biasing forces of the first spring S1 and the second spring S2 are set such that the valve re-closing pressure of the main valve 40 relative to the first valve seat 27 is higher than the valve re-opening pressure of the sub valve 70 relative to the second valve seat 64, and the first opening 24 and the second opening 33 communicate with each other via the external space R2 in a state in which the main valve 40 is separated from the first valve seat 27. Further, a valve seat with which the main valve 40 is brought into contact or from which the main valve 40 is separated from to block ventilation is not provided at the second opening 33 side of the housing 11, and further, in the normal state shown in FIG. 3, the second spring S2 biases a tip end side (the valve head 72 side) of the sub valve 70 in a direction away from the second valve seat 64, and the tip end side of the sub valve 70 is constantly separated from the second valve seat 64, so that the other end opening 63 of the main valve 40 is opened.

Therefore, when the state is changed from the main valve opened state shown in FIG. 5 to the two-valve closed state shown in FIG. 4 and the main valve 40 slides (when the main valve 40 is re-closed), the sub valve 70 is not separated from the second valve seat 64 and the main valve 40 slides while maintaining a state in which the sub valve 70 closes the second valve seat 64, so that a state is maintained in which gas does not flow through the internal space R1 of the main valve 40 and gas flows through the external space R2 while maintaining a state in which the external space R2, between the inner periphery of the housing 11 and the outer periphery of the main valve 40 communicates with the first opening 24 and the second opening 33. As compared with a configuration in which the second valve seat is provided at the second opening side in the over-fueling prevention valve (JP 5805750 B) in the related art, since the second valve seat to which the main valve 40 is brought into contact and from which the main valve 40 is separated is not provided at the second opening 33 side in the over-fueling prevention valve 10, a large flow path area at the second opening 33 side can be ensured.

Therefore, when the main valve 40 is separated from the first valve seat 27 against the biasing force of the first spring S1 from a state in which the full tank limit valve 3 is closed, the pressure in the fuel tank 2 rises at once, and fuel filling is stopped, as indicated by arrows in FIG. 5, gas such as fuel vapor flows from the first opening 24 and passes through the large second opening 33 via the external space R2, so that the gas can smoothly flow out to the evaporation line 5, and the pressure in the fuel tank 2 can be reduced faster than that in the over-fueling prevention valve in the related art.

A reference numeral B in FIG. 8 shows a line indicating a lowering speed of an internal pressure in a tank in a state in which the pressure in the fuel tank rises at once and fuel filling is stopped in the over-fueling prevention valve in the related art, and as compared with this line, an inclined line shown by reference numerals A2 and A3 in FIG. 8 in the over-fueling prevention valve 10 according to the present invention is more acute, so that a lowering speed of an internal pressure in a tank can be increased.

As described above, in the over-fueling prevention valve 10 according to the present invention, since the lowering speed of the internal pressure in the tank can be increased as compared with the over-fueling prevention valve in the related art, it is possible to prevent a situation such as overflow of fuel from the fuel filling port 7a of the fuel filling pipe 7 (backflow of fuel).

In the present embodiment, since the plurality of sub valve contact ribs 55 with which the base end side of the sub valve 70 is brought into contact are provided at the inner peripheral side of the one end opening 54 of the main valve 40, the base end side of the sub valve 70 biased by the second spring S2 can be supported by the plurality of sub valve contact ribs 55, and as shown in FIG. 3, the tip end side of the sub valve 70 can be stably held in a state in which the sub valve 70 is separated from the second valve seat 64 of the main valve 40. Further, since the ventilation paths R3 that communicate with the one end opening 54 are formed between the sub valve contact ribs 55, ventilation can be ensured in a state in which the base end side of the sub valve 70 is supported by being brought into contact with the plurality of sub valve contact ribs 55.

In the present embodiment, as shown in FIGS. 3 to 5, one end of the second spring S2 is supported by an inner end surface of the main valve 40 at the other end opening 63 side and is externally mounted to an outer side of the sub valve 70, and the other end of the second spring S2 is supported by the spring support seat 73, so that inclination of the second spring S2 can be prevented and it is easy to set a desired biasing force with high accuracy.

The present invention is not limited to the embodiment described above, and various modified embodiments can be made within the scope of the gist of the present invention, and such embodiments are also included in the scope of the present invention.

EXAMPLE

A relationship between an air flow rate and a pressure was measured for over-fueling prevention valves in an Example and Comparative Examples 1 to 3.

Comparative Example 1

An over-fueling prevention valve in Comparative Example 1 having the same structure as the invention described in JP 5805750 B was manufactured. An opening diameter of a tip end of a valve head portion (a component denoted by a reference numeral "62" in the specification of JP 5805750 B) is 2.8 mm.

Comparative Example 2

Other than an opening diameter of a tip end of a valve head portion was set to 3.2 mm, an over-fueling prevention valve in Comparative Example 2 having the same structure as that in Comparative Example 1 was manufactured.

Example

Figure 6:
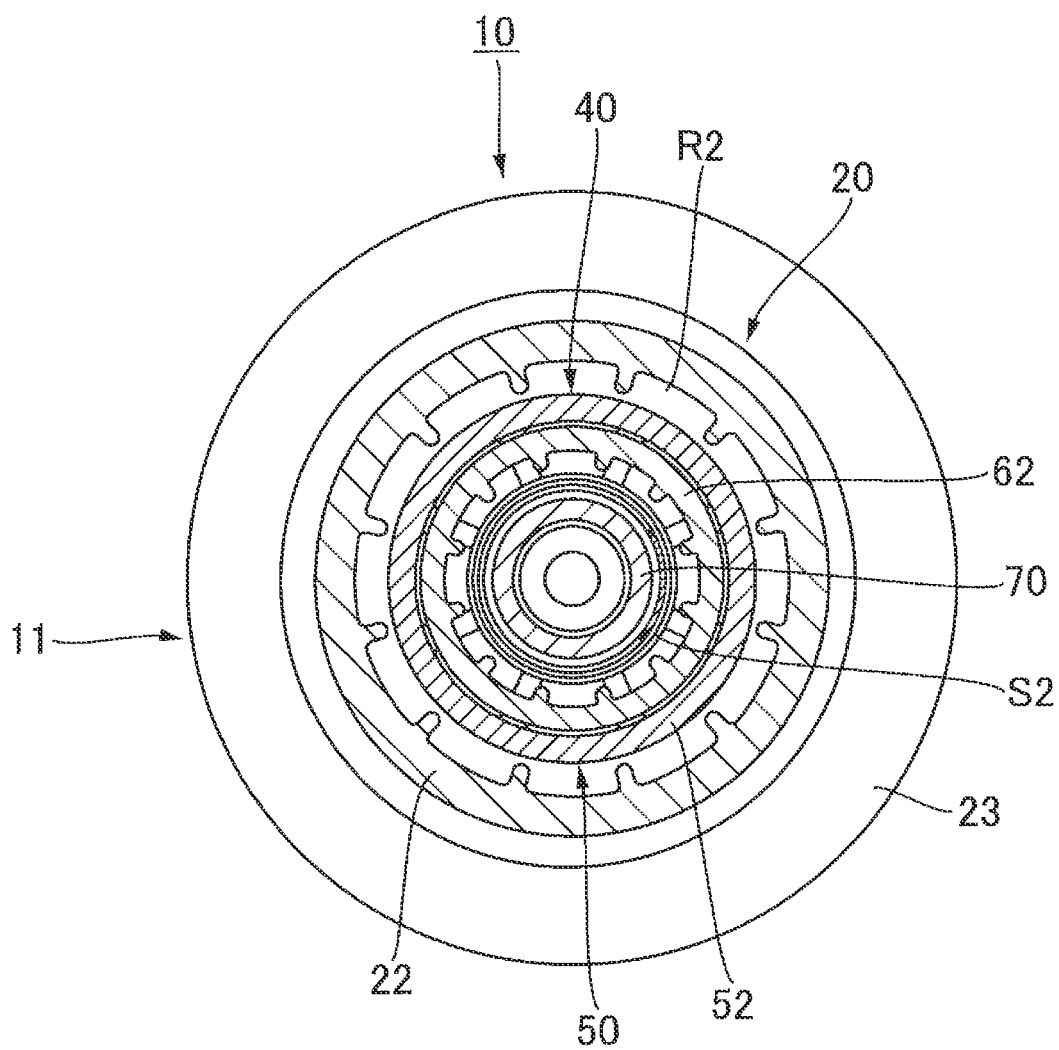
FIG. 6 is a cross-sectional view taken along a line A-A in FIG. 3.

An over-fueling prevention valve in the Example having the same structure as the over-fueling prevention valve shown in FIGS. 1 to 6 was manufactured. As shown in FIG. 6, an opening area of the external space R2 formed between the inner periphery of the housing and the outer periphery of the main valve (here, between the inner periphery of the cylindrical portion 22 of the first housing 20 and the outer periphery of the outer cylindrical portion 52 of the valve body 50 of the main valve 40) in a predetermined cross section orthogonal to an axial direction of the over-fueling prevention valve is set to 55.228 mm$^2$ corresponding to 8.38 mm of the tip end opening diameter of the valve head portion of the valve in Comparative Example 1 and Comparative Example 2.

Test Method

The over-fueling prevention valves in the Example and the Comparative Examples 1 and 2 are set in a predetermined test tank, air flowed through the valve in a manner in which air flows through from the first opening at the tank side to the second opening at the canister side while pressure rises, and a relationship between a pressure and an air flow rate was measured. Results are shown in FIG. 9.

Test Result

Figure 9:
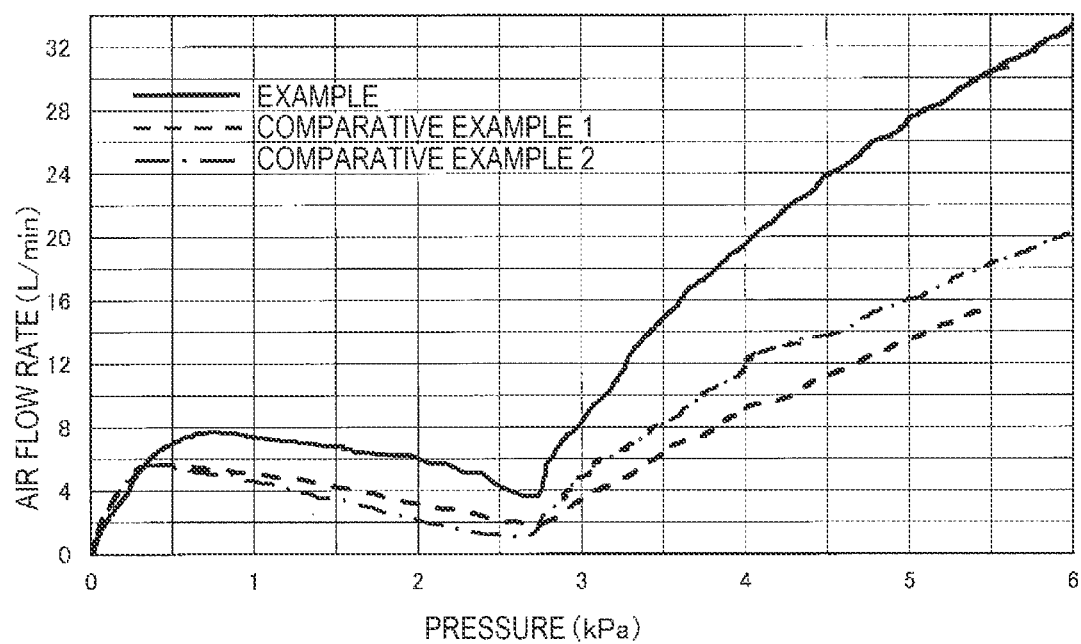
FIG. 9 is a diagram showing test examples of the over-fueling prevention valve and showing a relationship between a pressure and an air flow rate.

As shown in FIG. 9, it can be seen that, as in the over-fueling prevention valve in Comparative Example 2, the air flow rate increases in a case where an inner diameter of the second valve seat is larger than that in the over-fueling prevention valve in Comparative Example 1, In the over-fueling prevention valve in the Example, the air flow rate was further increased as compared with the over-fueling prevention valve in Comparative Example 2, and an effect of increasing a gas flow rate by the external space could be demonstrated.

REFERENCE SIGNS LIST 1 fuel tank device
2 fuel tank
3 full tank limit valve
4 canister
5 evaporation line
5b canister-side pipe
5c tank-side pipe
6 cut valve
7 fuel filling pipe
10 over-fueling prevention valve
11 housing
20 first housing
24 first opening
25 tank-side connecting pipe
27 first valve seat
30 second housing
33 second opening
34 canister-side connecting pipe
35 spring support rib
40 main valve
50 valve body
54 one end opening
55 sub valve contact rib
60 valve cap
63 the other end opening
64 second valve seat
70 sub valve
73 spring support seat
R1 internal space
R2 external space
R3, R4 ventilation path
S1 first spring (first biasing portion)
S2 second spring (second biasing portion)

The invention claimed is:

1. An over-fueling prevention valve provided at an evaporation line of a fuel tank device including a full tank limit valve that closes a discharge port of fuel vapor when a fuel liquid level reaches a predetermined height at a time of filling fuel to a fuel tank and the evaporation line that enables an inner side of the fuel tank and a canister provided outside the fuel tank to communicate with each other, the over-fueling prevention valve comprising:

a housing provided with a first opening that communicates with the fuel tank, a second opening that communicates with the canister, and a first valve seat provided at the first opening;

a main valve that is slidably disposed in the housing, that is configured to be brought into contact with or separated from the first valve seat, that has an internal space inside the main valve, and that is provided with one end opening for communicating with the first opening, an other end opening for communicating with the second opening, and a second valve seat formed at the other end opening at a side close to the internal space;

a first spring configured to bias the main valve toward the first valve seat;

a sub valve that is slidably disposed in the internal space of the main valve and is configured to be brought into contact with or separated from the second valve seat; and a second spring that is disposed in the internal space of the main valve and is configured to bias the sub valve in a direction away from the second valve seat, wherein biasing forces of the first spring and the second spring are set such that a valve re-closing pressure when the main valve is brought into contact with the first valve seat again from a state in which the main valve is separated from the first valve seat against a biasing force of the first spring by a pressure in the fuel tank is higher than a valve re-opening pressure when the sub valve is separated from the second valve seat again from a state in which the sub valve is brought into contact with the second valve seat against a biasing force of the second spring by the pressure in the fuel tank, and wherein the first opening and the second opening are configured to communicate with each other via an external space between an inner periphery of the housing and an outer periphery of the main valve in a state in which the main valve is separated from the first valve seat.

2. The over-fueling prevention valve according to claim 1, wherein a tip end side of the sub valve is configured to be brought into contact with or separated from the second valve seat, and wherein a plurality of sub valve contact ribs with which a base end side of the sub valve is brought into contact are provided on an inner periphery of the main valve at a side close to the one end opening, and a ventilation path that communicates with the one end opening are formed between the sub valve contact ribs.

3. The over-fueling prevention valve according to claim 1, wherein the second spring is a coil spring, wherein a spring support seat is provided at the base end side of the sub valve, and wherein, one end of the coil spring is supported by the spring support seat, an other end of the coil spring is supported by an inner end surface of the main valve at a side close to the other end opening, and the coil spring is externally mounted to an outer side of the sub valve.

* * * * *